United States Patent [19]

Vollmann

[11] Patent Number: 5,592,352
[45] Date of Patent: Jan. 7, 1997

[54] SYSTEM FOR RECORDING/REPRODUCING SIGNALS ON/FROM A MAGNETIC TAPE IN A CASSETTE

[75] Inventor: Norbert C. Vollmann, Eindhoven, Netherlands

[73] Assignee: U.S. Philips Corporation, New York, N.Y.

[21] Appl. No.: 464,909

[22] Filed: Jun. 5, 1995

Related U.S. Application Data

[62] Division of Ser. No. 927,783, Aug. 10, 1992, which is a continuation of Ser. No. 545,307, Jun. 26, 1990, abandoned.

[30] Foreign Application Priority Data

Jun. 26, 1989 [NL] Netherlands ................... 8901605

[51] Int. Cl.⁶ ...................................... G11B 23/02
[52] U.S. Cl. ............................................. 360/132
[58] Field of Search ...................... 360/94, 132; D14/121

[56] References Cited

U.S. PATENT DOCUMENTS

| | | | |
|---|---|---|---|
| D. 258,585 | 3/1981 | Yoshizawa | D14/121 |
| D. 275,750 | 10/1984 | Shimizu | D14/121 |
| D. 317,155 | 5/1991 | Hashimoto | D14/120 |

FOREIGN PATENT DOCUMENTS

57-103105  6/1982  Japan .

Primary Examiner—John H. Wolff
Assistant Examiner—David D. Davis
Attorney, Agent, or Firm—Brian J. Wieghaus

[57] ABSTRACT

A system in which signals can be recorded on or reproduced from a magnetic tape in a cassette, the system comprising standard apparatuses and standard cassettes (29) which are adapted to each other in conformity with a specific standard, which standard cassettes can be positioned correctly on the standard apparatuses by means of at least one standard locating pin (41) which is engageable in a standard locating aperture (39) of the standard cassette. The standard system is a subsystem of a larger system which also includes deviating apparatuses (1) and deviating cassettes (3) which are adapted to one another in conformity with a deviating standard, which deviating apparatus comprises at least one deviating locating pin (21) which is engageable with clearance in a deviating locating aperture (35A, B) of a deviating cassette but also in a standard locating aperture (37A, B) of a standard cassette, but which deviating locating aperture (35A, B) has such a shape that the standard locating pin (41) is not engageable in the deviating standard aperture.

8 Claims, 5 Drawing Sheets

SYSTEM FOR RECORDING/REPRODUCING SIGNALS ON/FROM A MAGNETIC TAPE IN A CASSETTE

This is a division of application Ser. No. 07/927,783, filed on Aug. 10, 1992 pending, which is a continuation of application Ser. No. 07/545,307, filed on Jun. 26, 1990 now abandoned.

BACKGROUND OF THE INVENTION

1. Field of the Invention

The invention relates to a system for recording/reproducing signals on/from a magnetic tape in a cassette, which system comprises standard apparatuses and standard cassettes which are adapted to each other in conformity with a specific standard, which standard apparatuses comprise at least one standard locating pin for correctly positioning a standard cassette, and which standard cassettes have at least one standard locating aperture in which the standard locating pin is engageable.

2. Description of Related Art

An example of a system of the type referred to above is the well-known Compact Cassette system in conformity with the international standard IEC 94-7. This system has been enormously successful, which has led to the sale of billions of cassettes and correspondingly huge quantities of associated apparatuses in the more than twenty years it has been on the market. Just like any other standard system the Compact Cassette system leaves only limited room for improvements and innovations. This is because the standard prescribes the principal electrical, magnetic, mechanical and format parameters, so that within the standard there are no or only limited possibilities of deviating from these parameters which are essential for the compatibility between the cassettes and apparatuses belonging to the system.

The Compact Cassette system has been designed for analog recording and reproducing of audio signals. In recent years there has been an enormous evolution in digital technologies for recording and reproducing audio signals. Digital technologies have enabled a substantially higher quality of sound reproduction to be achieved, so that in this respect the Compact Cassette system may be regarded as outmoded. In order to meet the consumer's demand for a system of recording/reproducing digital audio signals on magnetic-tape cassettes, new system have been proposed in conformity with a new standard, comprising novel cassettes and associated novel apparatuses. In principle, old apparatuses and old cassettes in conformity with an existing standard might be used for the novel digital audio system, requiring the necessary modifications to the apparatuses and perhaps the use of a different magnetic tape. However, the resulting confusion amongst consumers, who would no longer know which cassettes to use in which apparatuses, would be likely to invoke an antagonistic response from the consumer, not only with respect to the new but even with respect to the old system.

The new standard deviates from the old standard. This makes it necessary for the consumer to purchase new equipment with associated new cassettes. This represents a considerable investment, in particular because the manufacture of both the new equipment and the new cassettes requires investments from the manufacturer, leading to higher prices, in particular upon the introduction of the new system. The manufacturer needs time to gain experience with the manufacture of the new products. Therefore, cutbacks in costs through rationalisation and scaled-up production are to be envisaged only after a certain period of time.

For basically the same reasons new systems, such as new digital audio systems but also other new systems, may therefore meet with failure already in the initial stage. The large initial investments made in the development and the start of production may then be regarded as lost, at least partly.

SUMMARY OF THE INVENTION

The invention aims at providing a system of the type defined in the opening paragraph, which lends itself for renovations and innovations which stand a better chance to be successful on the market, and is characterized in that the system also includes deviating apparatuses and deviating cassettes which are adapted to one another in conformity with a deviating standard, which deviating cassettes have at least one locating aperture of deviating shape in which the standard locating pin is not engageable and which deviating apparatuses comprise at least one deviating locating pin which is engageable with some clearance both in the standard locating aperture and in the deviating locating aperture.

The system in accordance with the invention enables innovations and renovations to be made, requiring less new investments from the manufacturer. This is because the new deviating cassettes and apparatuses can remain largely the same, at least mechanically. The new apparatuses can be adapted at least to play the old cassettes which are still in the consumer's possession. There is no risk of the new cassettes being played on an old apparatus because the new cassettes are not accepted by the old standard apparatuses as a result of the deviating shape of the locating aperture. Therefore, the system in accordance with the invention provides upward compatibility, i.e. the system includes the existing standard apparatuses and standard cassettes as a subsystem but adds a new subsystem which allows acceptance of the old standard cassettes but which also includes cassettes which are not accepted by the old standard apparatuses, so that undesirable and confusing mistakes are precluded.

It is to be noted that in prior U.S. patent application Ser. No. 532,469 filed by Norbert C. Vollmann et al on May 31, 1990 (herewith incorporated by reference), a system has been proposed comprising apparatuses and cassettes of a first and a second standard type, in which the cassettes of the first standard can be played on apparatuses of the second standard, so that this previously proposed system also provides upward compatibility. In order to avoid confusion on the part of the consumer it is proposed to give the cassettes of the second standard a distinctly different appearance so that even if the cassette is not labelled the cassette differs both in a visual and tactile manner from the cassette of the first standard. It is also proposed to utilise the difference in outward distinctive features between cassettes of the two types in order to detect the type of cassette loaded into an apparatus, if desired in conjunction with means for inhibiting recording and/or reproduction of signals on the cassette. However, no means are provided which simply inhibit the new cassette to be loaded into an old apparatus but which nevertheless allows both the new and the old cassettes to be loaded into a new apparatus. The present invention effectively solves this problem.

An important embodiment is intended to guarantee that in the deviating apparatus, regardless of which of the two types of cassette is inserted, the magnetic tape is always situated at the same level and is characterized in that both types of cassette comprise main walls and each locating aperture is formed in a main wall, the main walls of the cassettes of one type being situated at another distance from the edge of the magnetic tape than those of the cassettes of the other type, and in that the deviating locating pins comprise a standard supporting surface and a deviating supporting face for respectively supporting a standard cassette and a deviating cassette at the location of a locating aperture, which two supporting faces are spaced from one another at a distance equal to the difference between the distances from the main walls of the cassettes to the magnetic tape, so that the magnetic tape of a cassette loaded into the deviating apparatus is always situated at the same position regardless of the type of cassette. For example, in the well-known Compact Cassette the main walls are spaced from each other at a comparatively large distance in relation to the width of the magnetic tape at the location of the locating apertures. In developing the Compact Cassette standard said distance has been so selected to enable magnetic heads to be manufactured with the technologies then available in such a way that they could be accommodated in the space between the main walls of the cassettes. Current technology enables magnetic heads of a smaller height to be manufactured. Thus, if the standard cassettes should be constituted by the well-known Compact Cassettes the deviating cassettes could have a smaller distance between the main walls. The present embodiment of the invention provides a simple and elegant solution to the problem of guaranteeing the correct position of the magnetic tape in the deviating apparatuses, regardless of which of the two cassettes belonging to the system is inserted.

The locating apertures in the cassettes may give rise to the ingress of dust and contaminants into the interior of the cassette, which is undesirable for obvious reasons. In view of this an embodiment of the invention is of interest, which is characterized in that the projection of the deviating locating aperture is situated within the projection of the standard locating aperture. This embodiment guarantees that the deviating locating aperture is not larger than necessary. Preferably, the deviating locating aperture should have such a shape that already at an early stage of the introduction of a standard locating pin into the deviating locating aperture the user is given an indication, that the two elements are not compatible. Therefore, the deviating locating aperture should preferably have a small projection, in particular in the central part. On the other hand, the deviating locating pin should be engageable in a standard locating aperture with the required small clearance so that the periphery of deviating locating pins, and hence deviating locating apertures, would have to coincide with the periphery of a standard locating aperture at least at a number of peripheral locations. Moreover, it is desirable, or at least preferable, that the deviating locating aperture differs from the standard locating aperture in a visually identifiable manner to provide a visible distinction between the two types of cassette. In view of all these requirements an embodiment of the invention is found to be favourable, which is characterized in that the projection of the deviating locating aperture is at least substantially star-shaped.

An embodiment, which is useful for reasons to be explained in the description with reference to the Figures, is characterized in that the deviating locating aperture has substantially the shape of a four-pointed star, whose facing points have connecting lines which extend substantially parallel to and transversely to a front side of the deviating cassette.

A further favourable embodiment of the cassette is characterized in that the cassette has two spaced-apart star-shaped locating apertures for engagement with two spaced-apart deviating locating pins, and one of the two locating apertures is slightly larger to allow for slight differences in distance in the direction of the interconnecting line. Many cassettes, such as for example the aforementioned Compact Cassettes, have two spaced-apart locating apertures adapted to cooperate with two locating pins in the apparatus. The invention guarantees that even in the case of star-shaped deviating locating apertures no problems will arise as a result of differences in distances between the two deviating locating apertures of a cassette and the two deviating locating pins of the deviating apparatuses.

An embodiment which is of interest in order to obtain the deviating locating pin is characterized in that the deviating locating pin comprises a conical portion extending from a free end and having recesses extending along its circumferential surface and terminating in a deviating supporting surface. The terminations of the recesses together automatically form the deviating supporting surface.

A further embodiment is favourable in order to obtain a standard supporting surface. This embodiment is characterized in that the conical portion adjoins a cylindrical portion having a diameter equal to the diameter of a standard locating pin and terminating near the standard supporting surface. In this embodiment the deviating locating pin thus comprises a cylindrical portion which can be substantially identical to the corresponding portion of a standard locating pin on which a conical portion is superposed which deviates from the standard locating pin.

Another very important embodiment is characterized in that the star-shaped locating aperture has a central space and the deviating locating pin has a free end which is engageable with clearance in the central space. It is important that the deviating locating pin and the deviating locating aperture are adapted to one another in such a way that a self-aligning effect is obtained upon introduction of the deviating location pin into the deviating locating aperture. When a round pin is inserted into a round aperture a small conical pilot edge at the end of the pin is adequate to ensure easy insertion of the pin into the aperture is small. When a star-shaped locating aperture is used, however, this is different because the locating pin is only engageable in the star-shaped aperture in a number of specific positions. However, in an embodiment as described above an effective self-aligning effect is guaranteed.

In comparison with the standard apparatuses the locating pins in the deviating apparatuses should be replaced by deviating locating pins. However, this is only a minor modification which has no consequences for the mechanical design of the remainder of the apparatus. This means that the manufacturer of the deck of the deviating apparatus can utilise all the experience and know how gained in possible many years of manufacturing the standard apparatuses for manufacturing deviating apparatuses and has to make only small substantially negligible investments in the manufacture of the deviating locating pins.

The invention relates no only to systems of the type defined in the opening paragraph but also to deviating cassettes and deviating apparatuses belonging to such systems.

BRIEF DESCRIPTION OF THE DRAWINGS

The invention will now be described in more detail, by way of example, with reference to the accompanying drawings in which.

The various Figures are shown to arbitrary scales which are not always the same.

DETAILED DESCRIPTION OF THE PREFERRED EMBODIMENTS

Figure 1:
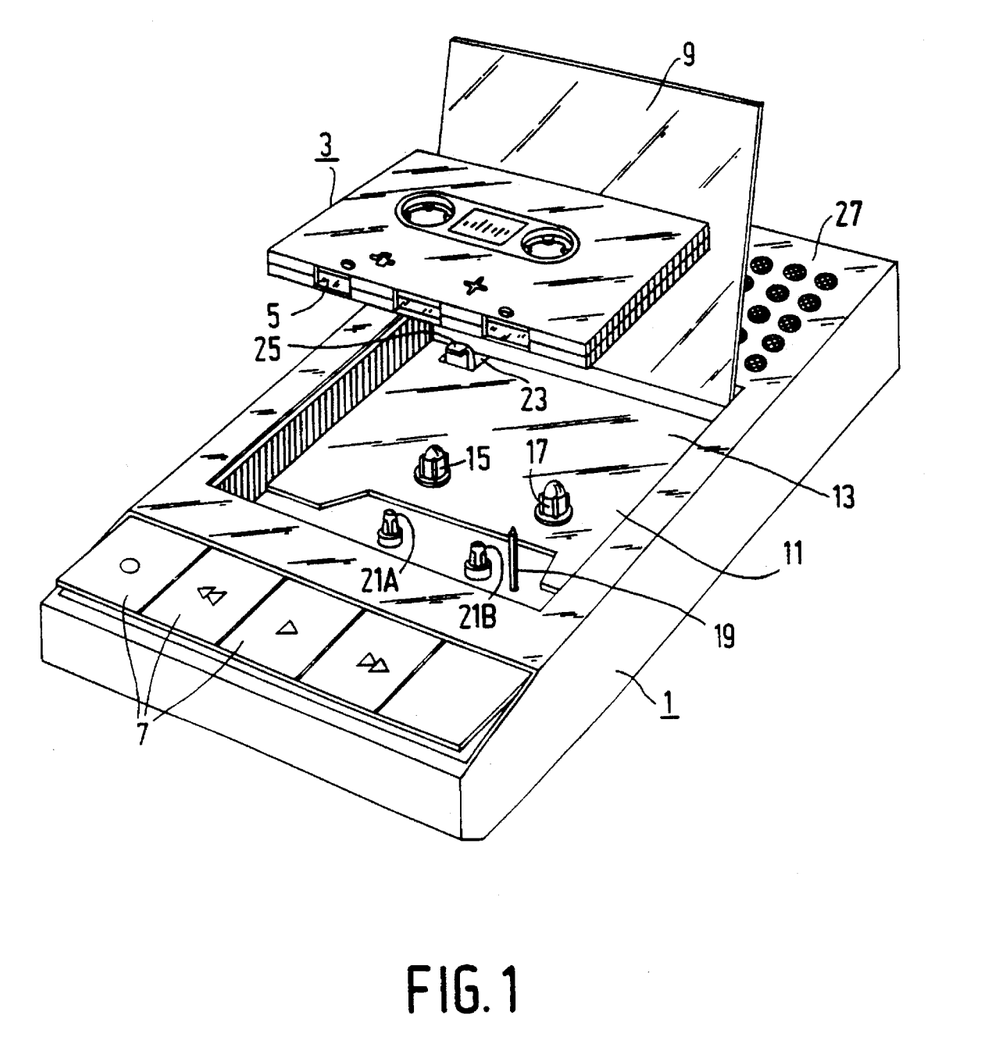
FIG. 1 is a perspective view of a deviating apparatus belonging to a system in accordance with the invention and at some distance therefrom a deviating cassette.

The deviating apparatus 1 shown in FIG. 1, which belongs to the system in accordance with the invention, may be regarded, at least mechanically, as a standard apparatus in accordance with the well-known Compact Cassette standard which is modified in some subordinate respects. The associated deviating magnetic tape cassette 3 may be regarded as a modified Compact Cassette. In the remainder of the description the term "old" is sometimes used instead of "standard" and the term "new" instead of "deviating".

The new cassette 3 is substantially identical to the Compact Cassette, when some modifications to the housing and the use of a different type of magnetic tape 5 are ignored. The apparatus shown is of a basically conventional type and comprises a plurality of actuating keys 7 at the front for function control. A pivotable cover 9 covers a receptacle 11 which is adapted to receive the cassette 3. At the bottom the receptacle 11 is bounded by a deck plate 13 of the mechanical tape deck. Two winding mandrils 15 and 17 and a capstan 19 extend through the deck plate 13. Moreover, the deck plate 13 carries two new locating pins 21A and 21B. At the back of the deck plate 13 an opening 23 is formed through which the end portion of a lever 25 extends, which lever serves for sensing the presence of an aperture in the rear wall of an inserted cassette. The position of the lever 25 controls an anti-erase device. A grill 27 is provided at the rear of the apparatus to allow the passage of the sound radiated by a built-in loudspeaker. Not shown in the drawing but arranged in the interior of the apparatus are a voltage source, for example an accumulator or batteries, and the necessary electrical and electronic elements for cooperation with both the old and the new cassettes and for reproducing and, if applicable, recording audio signals from/on the cassettes.

Figure 2:
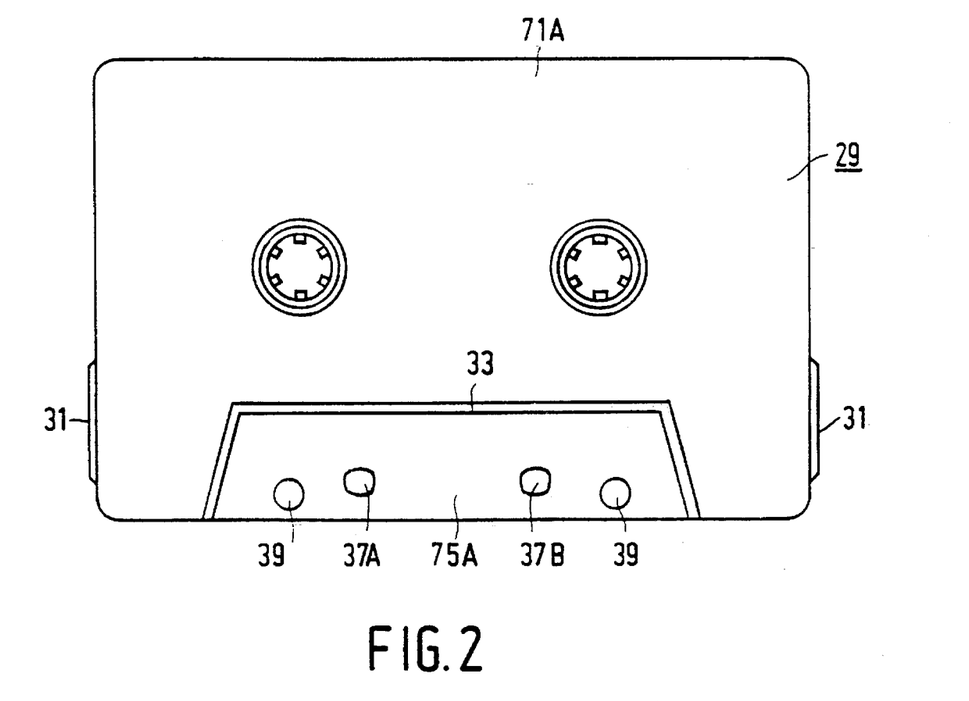
FIG. 2 is a plan view of a standard cassette in conformity with the Compact Cassette standard.
Figure 3:
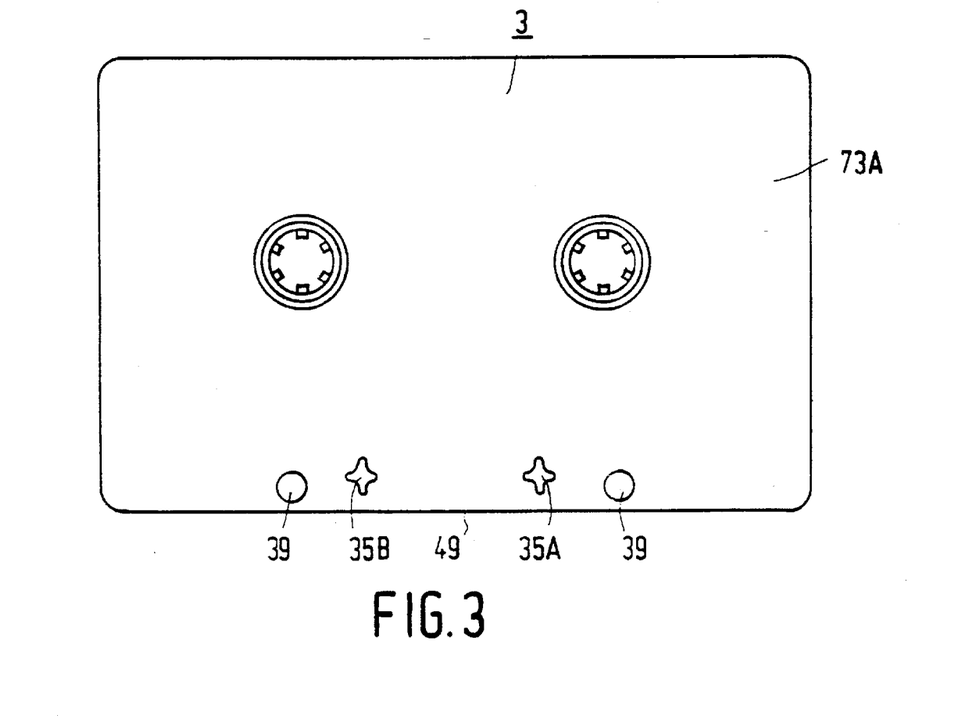
FIG. 3 is a view similar to that in FIG. 2 but showing a deviating cassette.

FIGS. 2 and 3 are plan views of an old cassette 29 and of a new cassette 3. The old cassette is a Compact Cassette. In conformity with the compact cassette standard ridges 31 are formed on opposite sides of the cassette. Moreover, a locally thicker portion 33 is provided at the front of the cassette. The principal dimensions of the new cassette 3 are substantially identical to those of the Compact Cassette but the new cassette does not comprise any ridges or a locally thicker portion similar to the ridges 31 and the thicker portion 33 of the Compact Cassette. As a result of this, in conformity with the aforementioned U.S. application Ser. No. 532,469, there is a distinctly visible and palpable difference between the old and the new cassettes, so that inadvertently interchanging the cassettes of the two types is substantially excluded. As already stated, the Compact Cassette system is intended for analog sound recording and reproduction. The novel system may be intended for digital sound recording in conformity with a new standard which deviates from the Compact Cassette standard. Obviously, the old apparatuses are only suitable for analog sound recording and/or reproduction in conformity with the Compact Cassette standard. However, the new apparatuses 1 may be suitable both for the old analog standard and the new digital standard or at least suitable for playing Compact Cassettes.

The new cassettes 3 have differently shaped locating apertures 35A and 35B. The old cassettes have old locating apertures 37A and 37B. Moreover, both cassettes have identical apertures 39 for the capstan 19.

A comprehensive description of further details of the two cassettes will not be given because Compact Cassettes are well known and the new cassettes merely exhibit modifications relating to the above-mentioned aspects.

Figure 4:
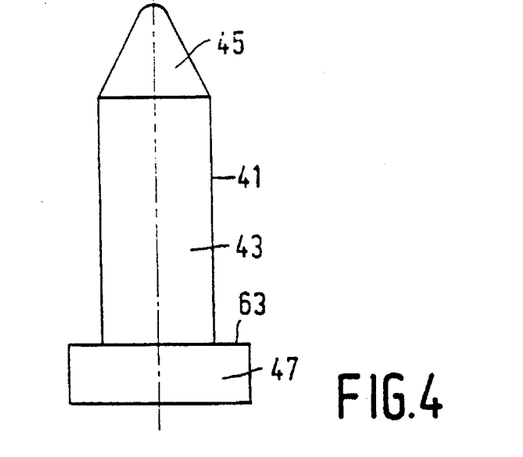
FIG. 4 is a side view of a standard locating pin.

The old locating pin 41 shown in FIG. 4 comprises a cylindrical shank 43, a rounded conical free end portion 45 and, at the other end, a cylindrical portion 47 of larger diameter. The old locating pin 41 is not engageable in the new locating apertures 35A or 35B of the new cassettes 3 but is adapted to engage in the old locating apertures 37A and 37B of the old cassettes 29. The new locating pin 21 is engageable both in the new locating apertures 35A and 35B and in the old locating apertures 37A and 37B.

Figure 5:
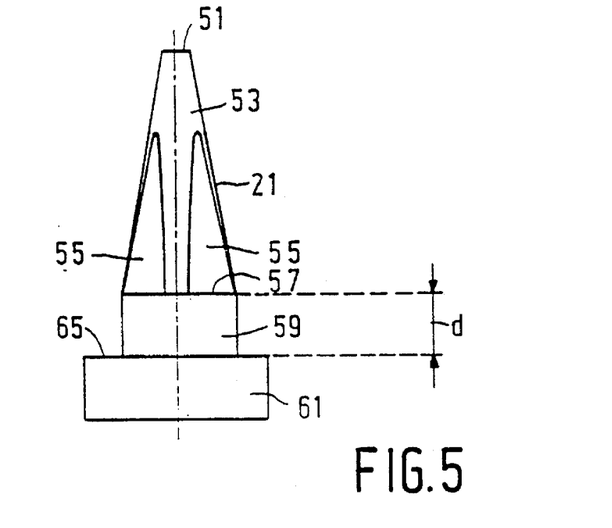
FIG. 5 is a side view of a deviating locating pin.
Figure 6:
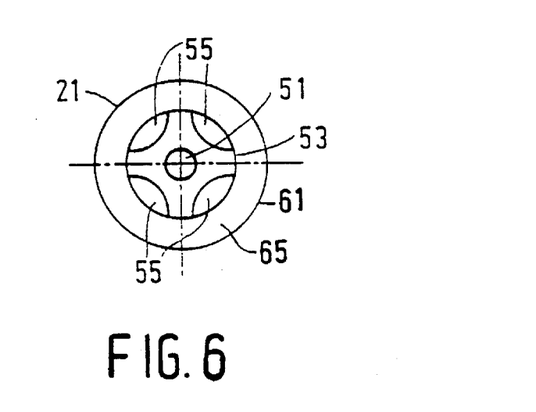
FIG. 6 is a plan view of the deviating locating pin shown in FIG. 5.
Figure 7A:
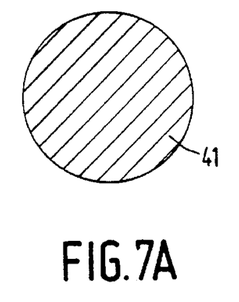
FIG. 7A is a highly enlarged sectional view of a standard locating pin.
Figure 7B:
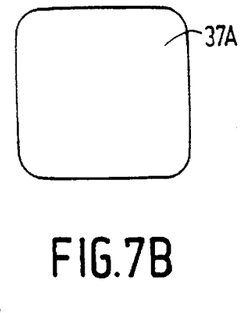
FIG. 7B shows the outline of a corresponding standard locating aperture.

The new locating apertures 35A and 35B are at least substantially star-shaped in projection. They have substantially the shape of a four-pointed star whose facing points are interconnected by imaginary connecting lines extending substantially parallel to and transversely of the front side 49 of the new cassette 3. The new locating pins 21 comprise a conical portion 53 extending from a free end face 51. Four recesses 55 extend along the circumferential surface of the conical portion 53. These recesses terminate in a new supporting surface 57. The conical portion 53 adjoins a cylindrical portion 59 having a diameter equal to the diameter of the shank 43 of the old locating pin 41. The new locating pin 21 further comprises a cylindrical portion 61 which is identical to the cylindrical portion 47 of the old locating pin. The transition between the portions 43 and 47 of the old locating pin 41 constitutes an old supporting surface 63. The new locating pin 21 has a corresponding old locating surface 65 at the transition between the cylindrical portions 59 and 61. By means of these supporting surfaces the old and new cassettes are positioned in height in the apparatuses, as will be described in more detail hereinafter.

Figure 14:
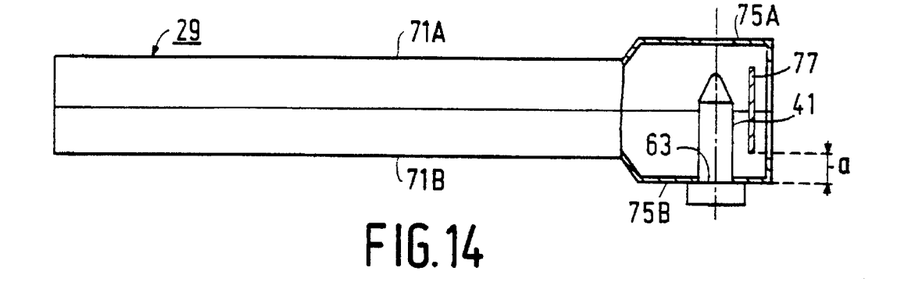
FIG. 14 is a side view, partly sectional view, of a standard cassette and a standard locating pin engaging in a locating aperture.
Figure 15:
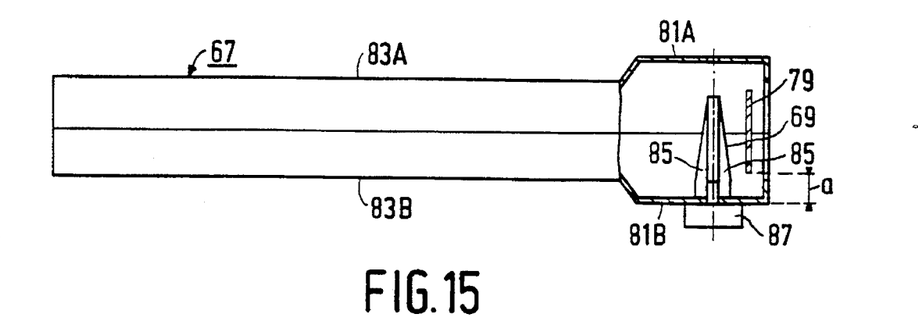
FIG. 15 is a view similar to that shown in FIG. 14 of a deviating cassette and a deviating locating pin.
Figure 16:
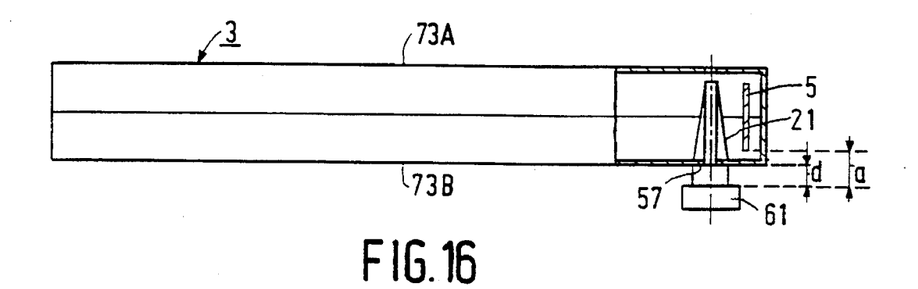
FIG. 16 is a side view similar to FIG. 15 but now showing another deviating cassette.
Figure 17:
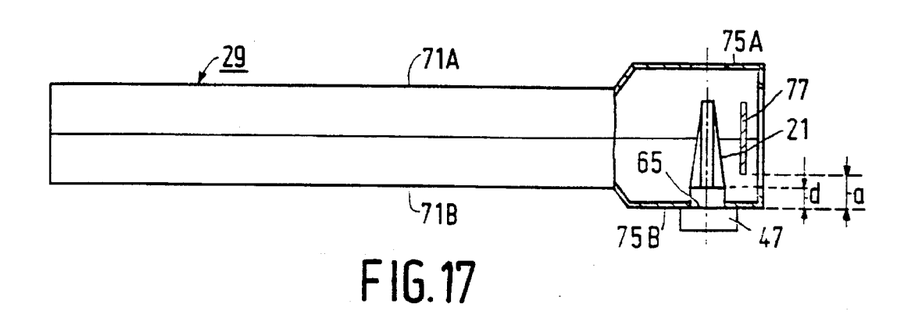
FIG. 17 is a side view similar to FIG. 16 but now showing a standard cassette.

FIGS. 14 and 17 show partly sectional side views of the old cassette 29. FIGS. 15 and 16 show two embodiments of a new cassette, FIG. 16 showing the cassette 3 of FIG. 3 and FIG. 15 showing another new cassette 67. FIG. 14 further shows the old locating pin 41 of FIG. 4 and FIGS. 16 and 17 show the new locating pin 21 of FIGS. 5 and 6. The new locating pin 69 shown in FIG. 15 differs slightly from the new locating pin 21.

FIGS. 14 to 17 do not show any irrelevant details. The old cassette 29 has plane-parallel main walls 71A and 71B. The new cassette 3 has main walls 73A and 73B. The main walls 71A and 71B are spaced at the same distance from each other as the main walls 73A and 73B. At its front the old cassette 29 has a thicker portion 33 (FIG. 2), which is dispensed with in the new cassette 3. As a result of this, the main walls 71A and 71B of the old cassette 29 comprise portions 75A and 75B which are spaced at a larger distance from each other at the location of the thicker portion 33 than walls 71A and 71B. The locating apertures 37A and 37B of the old cassette are formed in this thicker portion. Consequently, the portions 75A and 75B of the main walls of the old cassette are situated at another distance from the edge of the magnetic tape 77 than in the new cassette 3.

In all the cassettes shown in FIGS. 14 to 17 the distance between the supporting surface, which supports the cassette at the location of the locating aperture, and the lower edge of the magnetic tape is equal to a distance a. In all cases the position of the magnetic tapes of the different cassettes relative to the other parts of the deck of the associated apparatuses is therefore the same. When the old cassette 29, see FIG. 14, is loaded into an old apparatus it is positioned by old locating pins 41 and it is supported on an old supporting face 63 of the locating pin. When loaded into a new apparatus the cassette, see FIG. 17, is positioned by new locating pins 21 and is supported on a supporting surface 65 of the new locating pin. When loaded into a new apparatus a new cassette 3, see FIG. 16, is also positioned by the new locating pins 21 and is supported on the new supporting surface 57. The distance d between the supporting surfaces 57 and 65 is selected in such a way that the distance a between the supporting surface and the lower edge of the magnetic tape 5 or 77 is the same in both cases.

FIG. 15 shows that a cassette 67 can even more closely resemble the Compact Cassette 29 than the new cassette 3, which is achieved in that the new cassette 67 comprises portions 81A and 81B of the main walls 83A and 83B which are fully identical to the portions 75A and 75B of the main walls 71A and 71B of the old cassette. In the case of such a new cassette the new locating pin 69 should be of a slightly different construction. As is illustrated in FIG. 15, the new locating pin 69 does not have a cylindrical portion identical to the cylindrical portion 59 (FIG. 5) of the new locating pin 21. The recesses 85 extend to the cylindrical portion 87, whose upper surface constitutes both the old and the new supporting surface.

Figure 13:
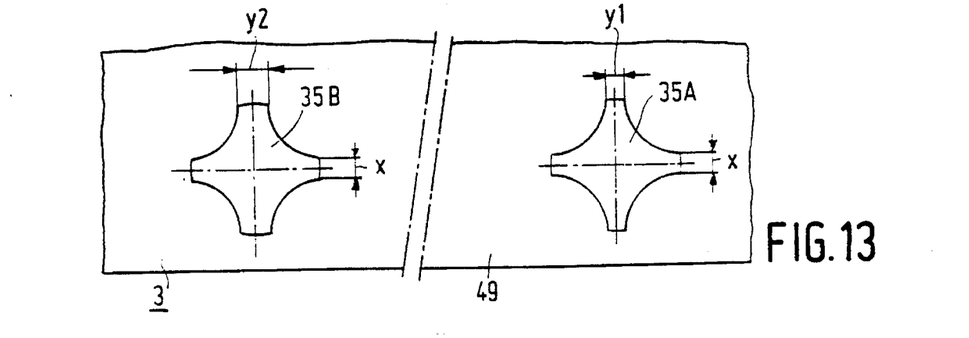
FIG. 13 is a plan view of a part of a deviating cassette and, at some distance therefrom, two deviating locating apertures formed in a deviating cassette.

The new cassette 3 comprises two spaced apart star-shaped locating apertures 35A and 35B (FIG. 3) for engagement with two spaced-apart new locating pins 21A and 21B (the latter not shown). To allow for slight distance tolerances in the direction of the interconnecting line the new locating aperture 35B (FIG. 13) provides some more clearance than the locating aperture 35A. As is shown in FIG. 13 the new locating apertures 35A and 35B have the same dimension x. Conversely, the transverse dimension y1 of the locating aperture 35A is smaller than the dimension y2 of the locating aperture 35B. This illustrates the importance of the use of a four-pointed star shape. The connecting lines between facing pints of the star extend in the x-direction and in the y direction. One of the two locating apertures should be slightly larger in the y-direction only. The position of the cassette in the x-direction and in the y-direction is well defined.

Figure 8A:
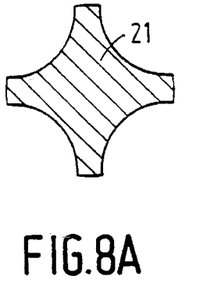
FIG. 8A is a sectional view of a deviating locating pin.
Figure 8B:
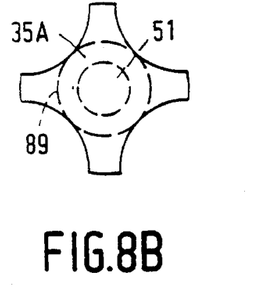
FIG. 8B shows the outline of an associated deviating locating aperture.
Figure 9:
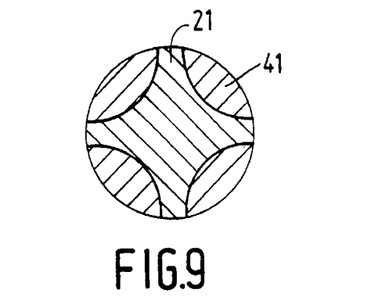
FIG. 9 is the sectional view of FIG. 8A projected onto the sectional view in FIG. 7A.
Figure 10:
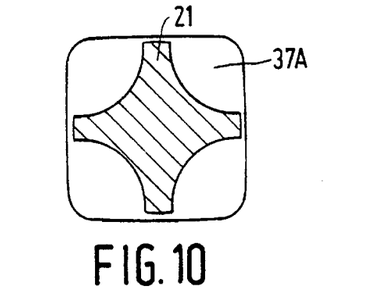
FIG. 10 shows the sectional view of FIG. 8A projected within the outline of the locating aperture shown in FIG. 7B.
Figure 11:
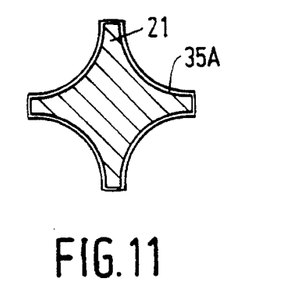
FIG. 11 shows the sectional view of FIG. 8A projected within the outline shown in FIG. 8B.
Figure 12:
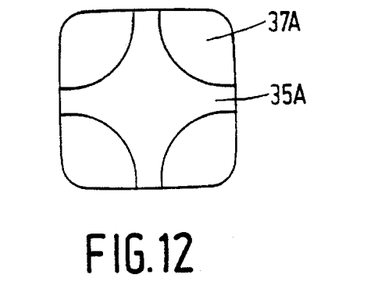
FIG. 12 shows the outline of FIG. 8B projected onto the outline of FIG. 7B.

The star-shaped new locating aperture 35A, see FIG. 8B, has a central space 89 in which the free end 51 of the new locating pin 21 is engageable with clearance. A broken line in FIG. 8B represents the projection of the end face 51 in the central space 89. The Figure clearly shows that the end face fits within the central space 89 with clearance all around, so that the end 51 is readily engageable in the star-shaped new locating apertures 35A even in the case of a slightly inaccurate initial positioning.

FIGS. 7A to 12 illustrate the relationship and the cooperation between the different projections of the locating pins and the locating apertures and require no further explanation. However, it is to be noted that the projection of the new locating aperture 35A does not fall outside the projection of the old locating aperture 37A, see FIG. 12. In principle, it is possible that at least a part of the locating aperture 35A extends beyond the projection of the old locating aperture 37A. However, the projection of the new locating pin 21, see FIG. 10, should always lie within the projection of the old locating aperture 37A. A larger dimension of the new locating aperture 35A therefore has no function and merely increases the likelihood of dust and dirt penetrating the cassette.

In the foregoing the invention has been described for a single exemplary embodiment, the standard system being the Compact Cassette system and the deviating system being a system comprising modified cassettes and apparatuses with star-shaped deviating locating apertures and locating pins. However, this does not mean that the scope of the invention is limited to the embodiment described herein. The standard system need not necessarily be the Compact Cassette system but may alternatively be the VHS video cassette system, the V2000 video cassette system, the 8 mm video cassette system or the RDAT audio cassette system to mention but a few examples. The Compact Cassette system and the deviating system derived therefrom and described herein are systems comprising reversible cassettes. This also applies to the V2000 video system. In said other systems the cassettes are not reversible. However, for the present invention this is irrelevant. The deviating locating apertures need not be star-shaped but, in principle, they may have any shape deviating from the shape of the standard locating aperture, for example polygonal or oval.

I claim:

1. The combination of a magnetic tape cassette with a magnetic tape cassette apparatus, said combination comprising:

a magnetic tape cassette apparatus having means for receiving a magnetic tape cassette, a magnetic head, and a locating pin with a conical portion extending from a free end and terminating at a shoulder of said locating pin, said conical portion having an outer surface and longitudinally extending recesses extending along a portion of said outer surface such that, in cross-section transverse to its length dimension, said outer surface of said conical portion of said locating pin has the shape of a four-pointed star, said recesses having respective ends adjacent said shoulder; and a magnetic tape cassette including a housing having a wall with a locating aperture extending through the wall and having a shape complementary to the shape of said conical portion of said locating pin for receiving said locating pin of said tape cassette apparatus, said aperture having a central region and four aperture appendages extending from said central region, each aperture appendage being defined by respective opposing pairs of inwardly directed projections of said wall directed inwardly towards said central region, said aperture appendages being aligned with each other in pairs with each pair being orthogonal to the other pair, at least one of said pairs defining a maximum diameter of said aperture and said central region being substantially smaller than said maximum diameter, said locating aperture has an outer periphery with the shape of a four-pointed star with said aperture appendages defining the points of said star, said inwardly directed projections and said appendages being sized such that with said locating pin fully received in said locating aperture said inwardly directed projections engage the ends of said recesses adjacent said shoulder of said shank portion.

2. The combination in accordance with claim 1, wherein said locating pin has a part opposite said free end which comprises a supporting surface for receiving a cassette with a locating aperture (i) which is larger than and (ii) which does not engage said conical portion of said locating pin.

3. The combination in accordance with claim 1, wherein the cross-section of said locating pin has one pair of points which are larger at their extremes than the extremes of the other pair of points.

4. A magnetic tape cassette for cooperation with a magnetic tape cassette apparatus having a receptacle for receiving the cassette, magnetic head means positioned in the receptacle, and a locating pin for locating the cassette with respect to the magnetic head, the locating pin including a cylindrical shank portion of a predetermined diameter, and a conical portion extending from a shoulder of said shank portion and terminating at a free end of the locating pin, said conical portion of said locating pin having an outer surface and recesses in said outer surface extending along the length dimension thereof such that a cross-section transverse to the length dimension of the locating pin is substantially star-shaped, said recess having an end adjacent said shoulder, said magnetic tape cassette comprising:

a) a cassette housing having first and second major walls and minor walls extending between said major walls, one of said minor walls defining a cassette front wall and including a tape opening;

b) a pair of tape winding spools rotatably disposed in said housing;

c) a length of magnetic tape connected to said tape winding spools and transportable past said tape opening in said front wall; and d) a locating aperture in said main wall, said locating aperture having a star-shaped outer periphery complimentary to the cross-section of the conical portion of said locating pin and being dimensioned such that with the locating pin fully received in said locating aperture the outer surface of said main wall bounding said star-shaped aperture engages the end of said recesses adjacent said shoulder of said shank portion.

5. A magnetic tape cassette according to claim 4, wherein said star-shaped aperture includes two opposing points aligned with said front wall of said cassette and two opposing points aligned transverse to said front wall.

6. A magnetic tape cassette according to claim 5, wherein said cassette includes two of said star-shaped locating apertures, and the two points aligned transverse to the front wall for only one of said apertures has a dimension along the direction aligned with said front wall which is greater than the same dimension of the same two points for the other said aperture.

7. A magnetic tape cassette according to claim 6, wherein said locating aperture includes a central cylindrical alignment space, interior of said star-shaped outer periphery, for receiving an aligning tip portion of the locating pin.

8. A magnetic tape cassette for cooperation with a magnetic tape cassette apparatus having a receptacle for receiving the cassette, magnetic head means positioned in the receptacle, and a locating pin for locating the cassette with respect to the magnetic head, the locating pin including a cylindrical shank portion of a predetermined diameter, and a conical portion extending from a shoulder of said shank portion and terminating at a free end of the locating pin, said conical portion of said locating pin having an outer surface and a recess in said outer surface extending along the length dimension thereof, said magnetic tape cassette comprising:

a) a cassette housing having first and second major walls and minor walls extending between said major walls, one of said minor walls defining a cassette front wall and including a tape opening;

b) a pair of tape winding spools rotatably disposed in said housing;

c) a length of magnetic tape connected to said tape winding spools and transportable past said tape opening in said front wall; and d) a locating aperture in said main wall, said locating aperture having an outer periphery including an inwardly directed portion for engaging in said recess in said outer surface of said conical portion of said locating pin, said locating aperture being dimensioned such that, with the locating pin fully received in said locating aperture, said inwardly directed portion of said locating aperture engages the end of said recess adjacent said shoulder of said shank portion.

* * * * *